United States Patent
Kline et al.

(10) Patent No.: US 10,558,790 B2
(45) Date of Patent: Feb. 11, 2020

(54) MULTI-LEVEL MATRIX PASSWORDS

(71) Applicant: International Business Machines Corporation, Armonk, NY (US)

(72) Inventors: Eric V. Kline, Rochester, MN (US); Mark E. Maresh, Wake Forest, NC (US); Colm Nolan, Meath (IE); Juan F. Vargas, Cary, NC (US); Cheranellore Vasudevan, Bastrop, TX (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 15/609,221

(22) Filed: May 31, 2017

(65) Prior Publication Data
US 2018/0349578 A1    Dec. 6, 2018

(51) Int. Cl.
*G06F 7/04* (2006.01)
*G06F 21/00* (2013.01)
*G06F 21/31* (2013.01)
*H04L 29/06* (2006.01)

(52) U.S. Cl.
CPC ............ *G06F 21/31* (2013.01); *H04L 63/083* (2013.01)

(58) Field of Classification Search
CPC ................................. H04L 63/083; G06F 21/31
USPC .................................. 726/5, 6; 713/182, 183
See application file for complete search history.

(56) References Cited

U.S. PATENT DOCUMENTS

| | | | | |
|---|---|---|---|---|
| 5,428,349 A | * | 6/1995 | Baker ................. | G06Q 20/382 235/382.5 |
| 5,931,948 A | | 8/1999 | Morisawa et al. | |
| 6,720,860 B1 | * | 4/2004 | Narayanaswami ..... | G06F 21/31 340/5.54 |
| 8,275,994 B2 | | 9/2012 | Funahashi et al. | |
| 8,766,823 B2 | | 7/2014 | Zilberman | |
| 9,053,294 B2 | | 6/2015 | Burkill | |
| 9,111,073 B1 | * | 8/2015 | Jiang ..................... | G06F 21/36 |
| 9,117,068 B1 | * | 8/2015 | Zhang .................... | G06F 21/36 |

(Continued)

OTHER PUBLICATIONS

Shin, An extension of role based access control for trusted operating systems and its coloured petri net model. Diss. Ph. D. thesis, Gwangju Institute of Science and Technology, Korea, 2005. (Background).

(Continued)

*Primary Examiner* — Aravind K Moorthy
(74) *Attorney, Agent, or Firm* — Garg Law Firm, PLLC; Rakesh Garg; Tihon Poltavets

(57) ABSTRACT

During a password entry, a matrix is traversed to select a position. The matrix includes several levels, each level in the several levels including at least one position where data can be entered, where a second level in the matrix forms a sub-level of a first level, and where the second level is reachable only from a particular position in the first level. In response to an input, a mode of the selected position is changed such that the position becomes unchangeable and unselectable during a remainder of the password entry. The selected position is encoded in an auth-step. In response to an indication of an end of the password entry, an auth-code is transmitted. The auth-code includes a set of auth-steps, and the set of auth-steps includes the auth-step.

20 Claims, 13 Drawing Sheets

(56) References Cited

U.S. PATENT DOCUMENTS

| | | | |
|---|---|---|---|
| 9,280,643 B2* | 3/2016 | Zhang | G06F 21/00 |
| 9,396,318 B2 | 7/2016 | Kowake et al. | |
| 9,401,914 B1* | 7/2016 | Jiang | H04L 63/083 |
| 10,049,358 B2* | 8/2018 | Briggs | G06Q 20/4012 |
| 2003/0005338 A1 | 1/2003 | Solioz | |
| 2004/0139331 A1 | 7/2004 | Sanai et al. | |
| 2005/0015614 A1* | 1/2005 | Gilfix | G06F 21/31 726/7 |
| 2005/0160297 A1* | 7/2005 | Ogawa | G06F 21/31 726/19 |
| 2008/0040611 A1* | 2/2008 | Huerta | H04L 45/02 713/182 |
| 2008/0141362 A1* | 6/2008 | Torres | G06F 21/36 726/18 |
| 2009/0144554 A1* | 6/2009 | Baker | G06F 21/31 713/183 |
| 2009/0158424 A1 | 6/2009 | Yang | |
| 2009/0161865 A1* | 6/2009 | Lee | H04L 9/0637 380/38 |
| 2010/0281526 A1* | 11/2010 | Raghavan | G06F 21/36 726/7 |
| 2011/0004928 A1* | 1/2011 | Won | G06F 21/36 726/7 |
| 2012/0166809 A1* | 6/2012 | Barton | H04L 9/0844 713/181 |
| 2013/0133053 A1* | 5/2013 | Akunuru | G06F 21/36 726/7 |
| 2013/0227676 A1* | 8/2013 | Guo | G06F 21/31 726/18 |
| 2013/0276100 A1* | 10/2013 | Yi | G06F 21/36 726/19 |
| 2014/0075512 A1* | 3/2014 | Vargas | G06F 21/46 726/4 |
| 2014/0181529 A1* | 6/2014 | Joyce, III | H04L 63/083 713/183 |
| 2014/0237565 A1* | 8/2014 | Fleysher | H04L 63/083 726/6 |
| 2014/0310805 A1 | 10/2014 | Kandekar | |
| 2015/0040192 A1 | 2/2015 | Kobold | |
| 2015/0312242 A1* | 10/2015 | Ogawa | G06F 21/34 726/6 |
| 2017/0154173 A1* | 6/2017 | Wang | G06F 21/31 |
| 2017/0286710 A1* | 10/2017 | Cheung | G06F 21/6218 |
| 2017/0286723 A1* | 10/2017 | Zhou | G06F 21/46 |
| 2017/0329944 A1* | 11/2017 | Satyavarapu | G06F 21/31 |
| 2018/0018455 A1* | 1/2018 | Tardif | G06F 21/46 |
| 2018/0191702 A1* | 7/2018 | Padmanabhan | H04L 63/083 |

OTHER PUBLICATIONS

Dinesha et al; Multi-Dimensional Password Generation Technique for Accessing Cloud Services, International Journal on Cloud Computing: Services and Architecture(IJCCSA),vol. 2, No. 3, Jun. 2012.

Naik et al; Multi-Dimensional and Multi-Level Authentication Techniques, International Journal of Computer Applications (0975-8887) vol. 75 No. 12, Aug. 2013.

Appendix P, 2017.

* cited by examiner

LEVEL 04 - 04 - 07 - 01

*FIGURE 6G*

LEVEL 04 - 04 - 07 - 01

US 10,558,790 B2

MULTI-LEVEL MATRIX PASSWORDS

TECHNICAL FIELD

The present invention relates generally to a system, and computer program product for creating and using strong passwords. More particularly, the present invention relates to a system, and computer program product for creating and using Multi-level matrix passwords.

BACKGROUND

A "password" is a method of authenticating a user or system to a server or service. Generally, a password includes a string of characters that is difficult to understand, guess, or reproduce. The harder the string is to understand, guess, or reproduce, the stronger is the password.

Some other types of passwords allow a user to draw a pattern with a finger or a stylus. The drawn pattern itself operates as a password and is compared with a pre-stored pattern. A match within a tolerance allows the user or system to be authenticated, a mismatch rejects the password.

Some other types of passwords allow a user to connect the dots in an arrangement of dots using a finger or a stylus. The pattern in which the dots are connected operates as a password and is compared with a pre-stored pattern. A match within a tolerance allows the user or system to be authenticated, a mismatch rejects the password.

Biometrics are also commonly used as passwords. For example, a pattern of lines and points in a user's fingerprint is stored as the user's password. More than one such fingerprint patterns may be stored for a user. When the user presents the fingerprint, the pattern in the presented fingerprint is matched within a tolerance with the stored pattern or patterns to authenticate the user.

Hereinafter, a "user" can be a human user or a system, who/which can present a password for authentication. Hereinafter, a "server" is any machine or service that can accept a password from the user and authenticate the user.

SUMMARY

The illustrative embodiments provide a system, and computer program product. An embodiment traverses, during a password entry, a matrix to select a position, wherein the matrix comprises a plurality of levels, each level in the plurality of levels comprising at least one position where data can be entered, wherein a second level in the matrix forms a sub-level of a first level, and wherein the second level is reachable only from a particular position in the first level. The embodiment changes, responsive to an input, a mode of the selected position such that the position becomes unchangeable and unselectable during a remainder of the password entry. The embodiment encodes the selected position in an auth-step. The embodiment transmits, responsive to an indication of an end of the password entry, an auth-code, the auth-code comprising a set of auth-steps, the set of auth-steps including the auth-step.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6E depicts another example step in using the multi-dimensional matrix to input a password in accordance with an illustrative embodiment;

FIG. 6F depicts another example step in using the multi-dimensional matrix to input a password in accordance with an illustrative embodiment;

FIG. 6G depicts another example step in using the multi-dimensional matrix to input a password in accordance with an illustrative embodiment;

FIG. 6H depicts another example step in using the multi-dimensional matrix to input a password in accordance with an illustrative embodiment;

DETAILED DESCRIPTION

Figure 1:
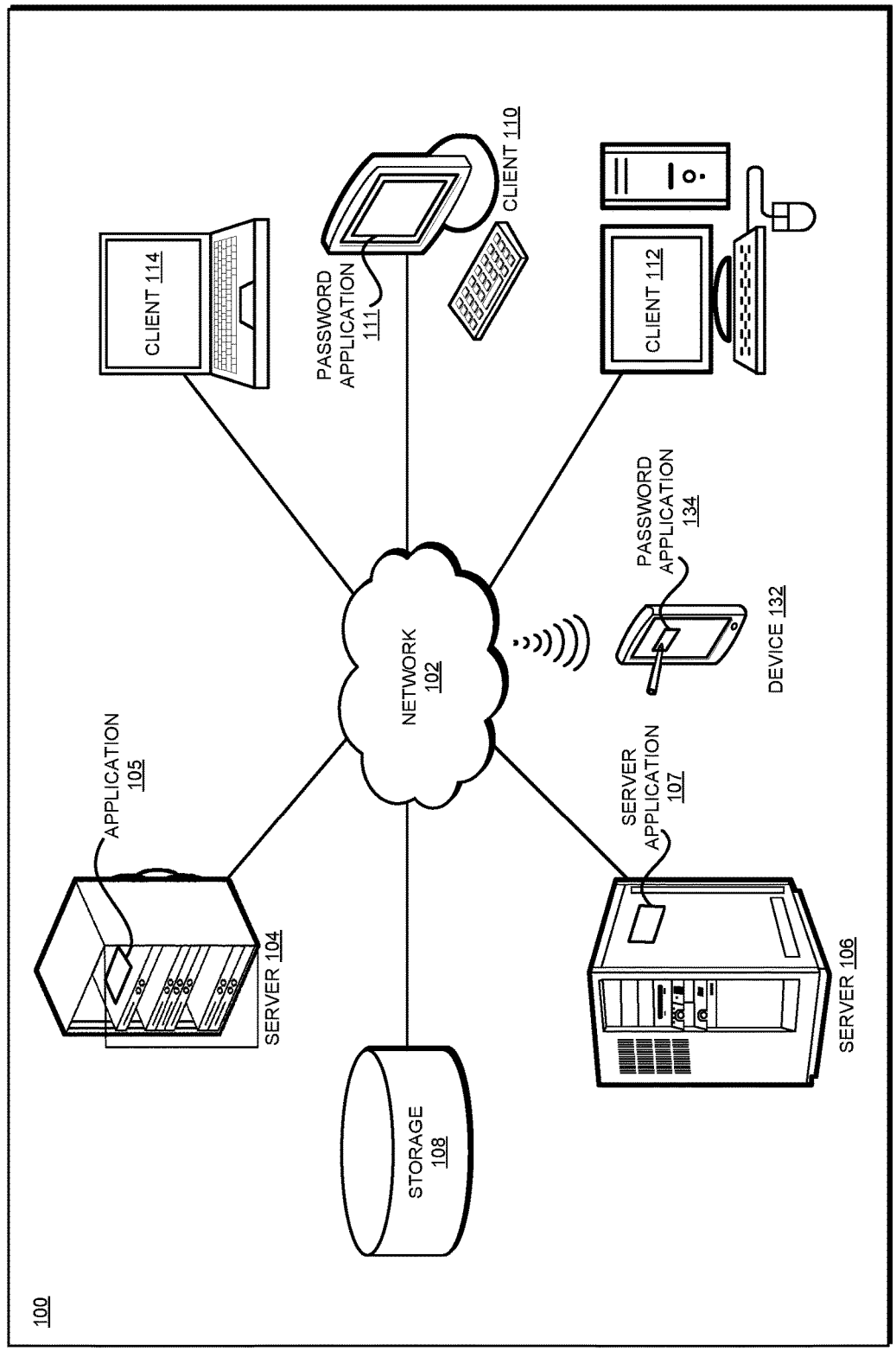
FIG. 1 depicts a block diagram of a network of data processing systems in which illustrative embodiments may be implemented.

The illustrative embodiments recognize that most presently used passwords are single-dimensional in nature. In other words, most presently used passwords are constructed using text or patterns that have a linear organization in which the text or patterns are input. Essentially, a presently used character-based password is a linear string of characters where the characters are input consecutively in a linear arrangement of password field positions. A drawn password is a sequential connection of dots, the sequentially drawn curve forming the password.

The illustrative embodiments recognize that to create a strong password, presently either the length of the password has to be increased, the set of characters from which the password is created has to be enlarged, the pattern has to be increased in complexity, or some combination thereof has to be applied. Regardless of how strong passwords are presently created, generally, a password has to be sufficiently long—e.g., 8-16 characters, at least a four-point pattern, and so on—for the password to be regarded as strong. Using the presently available techniques for creating passwords, compact passwords—e.g., a password as short as one or two characters—are regarded as weak passwords. The illustrative embodiments recognize that strong passwords of compact lengths can be produced by introducing in the password an additional dimension for input. Particularly, for character-based passwords, a multidimensional input method for inputting characters can create strong passwords with even a 0, 1, or 2-character lengths.

The illustrative embodiments recognize that the presently available tools or solutions do not address these needs/problems or provide adequate solutions for these needs/problems. The illustrative embodiments used to describe the invention generally address and solve the above-described problems and other related problems by creating and using multi-level matrix passwords.

An embodiment can be implemented as a software application. The application implementing an embodiment, or one or more components thereof, can be configured as a modification of an existing authentication system—i.e., a native application in the authentication system, as an application executing in a data processing system communicating with an existing authentication system over a local area network (LAN)—i.e., a local application on the LAN, as an application executing in a data processing system communicating with an existing authentication system over a wide area network (WAN)—i.e., a remote application on the WAN, as a separate application that operates in conjunction with an existing authentication system in other ways, a standalone application, or some combination thereof.

Hereinafter, a single character or dot position of a prior-art password is interchangeably referred to herein as a field position, placement location, or simply a location. For example, if a prior-art password is "adohl8urqn" the character "a" is in field position 1, character "d" is in field position 2, character "8" is in position 6, and so on.

An embodiment constructs a matrix for password input. A matrix is an n-dimensional structure of field positions where a character can occupy any position in any order during password input. A position in the matrix is reached by navigating the matrix.

The structure of the matrix is as follows—a number of positions are configured at a first level. One or more of these first level positions each have a second level. Each second level is configured with one or more positions. Different second levels are associated with different first level positions, and different second levels can have the same or different number of positions.

At least two levels exist in the matrix (two-dimensional matrix). Any number of additional levels can be configured in a similar manner. For example, one or more of the second level positions each can have a third level. Each third level is configured with one or more positions. Different third levels are associated with different second level positions, and different third levels can have the same or different number of positions.

In a similar manner one or more of the (n−1)th level positions each can have an (n)th level. Each (n)th level is configured with one or more positions. Different (n)th levels are associated with different (n−1)th level positions, and different (n)th levels can have the same or different number of positions.

Thus, an embodiment constructs an n-dimensional matrix, which comprises password field positions organized in n levels; some or all positions at a given level having a next level (sub-level); different sub-levels of different positions at a level having the same or different number of positions configured therein.

This manner of constructing an n-dimensional matrix is distinct from a 1, 2, or even 3-dimensional array of positions. For example, a 1-dimensional array may have 10 positions; a 2-dimensional array may have 10×10=100 positions; and a 3-dimensional array may have 10×10×10=1000 positions. However, a matrix according to the illustrative embodiments can have 10 positions in the first level; 20 second-level positions for position 3 of the first level, 200 second-level positions for position 5 of the first level, 10 second-level positions for position 6 of the first level, making (20+200+10=230) second level positions; and for simplicity, say, 20 third-level positions for positions for each of the second level positions off of position 3 of the first level, and 10 third-level positions for positions for each of the second level positions off of position 5 of the first level, making (20×20+10×200=2400) third level positions.

As can be seen from this simplified example, even a 2-dimensional matrix can be made significantly more complex than a 2-dimensional (n×n) array, and certainly more complex than a linear array of password field-positions that is presently used for character-based password entry. An n-dimensional matrix of the illustrative embodiments can be made unlimitedly complex in size and structure in this manner.

An embodiment enables navigation through the matrix for password entry. A password comprises a set of characters. At any position in the matrix, zero or more characters can be entered. For example, even though level 1 of the matrix may have 10 positions, a subset of characters, e.g., "sd&009!" may be entered at level 1 position 3, a single character "^" may be entered at level 1 position 5, and the remaining positions left blank.

Once a position is selected for entry, the position is recorded in the password regardless of whether any characters (zero or more) are entered at the selected position. The position is then locked from further manipulation of the entry and an authentication step (auth-step) is encoded using (i) the position's location in the matrix and (ii) any character data at that position, if entered. Similarly, zero or more positions in level 2 of one or more level 1 positions may be selected, receive zero or more characters, and locked. Similarly, zero or more positions in level n of one or more level n−1 positions may be selected, receive zero or more characters, and locked.

As can be seen from this example operation, simply navigating to various positions at various levels and locking them without entering any characters, can result in a password, or authentication code (auth-code), which would comprise a sequence of encoded authentication steps where the authentication steps include the positions that were selected and locked. A short password of 1-2 characters can be made strong by navigating the matrix to place those characters within the matrix.

The manner of creating and using Multi-level matrix passwords described herein is unavailable in the presently available methods. A method of an embodiment described herein, when implemented to execute on a device or data processing system, comprises substantial advancement of the functionality of that device or data processing system in creating and using compact yet strong passwords that encode field positions in an n-dimensional matrix used for the password entry.

The illustrative embodiments are described with respect to certain types of passwords, password lengths, field positions, matrix, levels, navigations, selection, locking, steps, auth-steps, auth-codes, manners of authentication, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
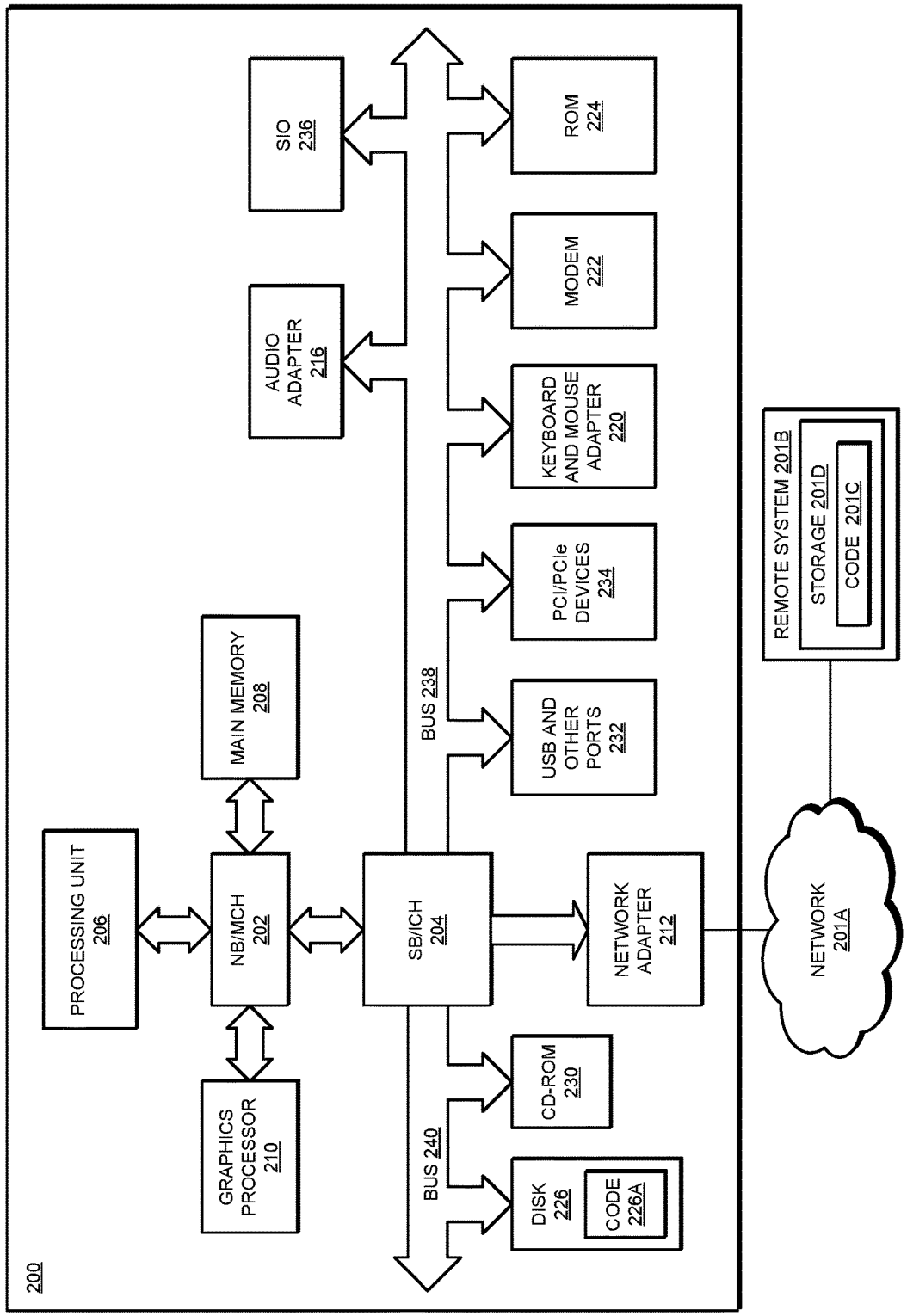
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 implements a remotely usable function (remote) of an embodiment described herein. As an example, application 111 implements a locally usable function (local) or a natively usable function (native) of an embodiment described herein. As an example, application 134 implements a natively usable function (native) of an embodiment described herein. Applications 105 and 111 can be used in a combination, applications 105 and 134 can be used in another combination, and applications 105, 111, and 134 can be used in another combination, to distribute certain functions of an embodiment. For example, any of applications 105, 111, or 134 can be configured to construct a matrix, receive a user input, construct an auth-step or an auth-code, or some combination of these functions, in a manner described herein. Any of applications 105, 111, or 134 can be further configured to submit the auth-code to a server for authentication, such as to server application 107.

Server application 107 is configured to recognize and use auth-codes for user authentication.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105, 111, or 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
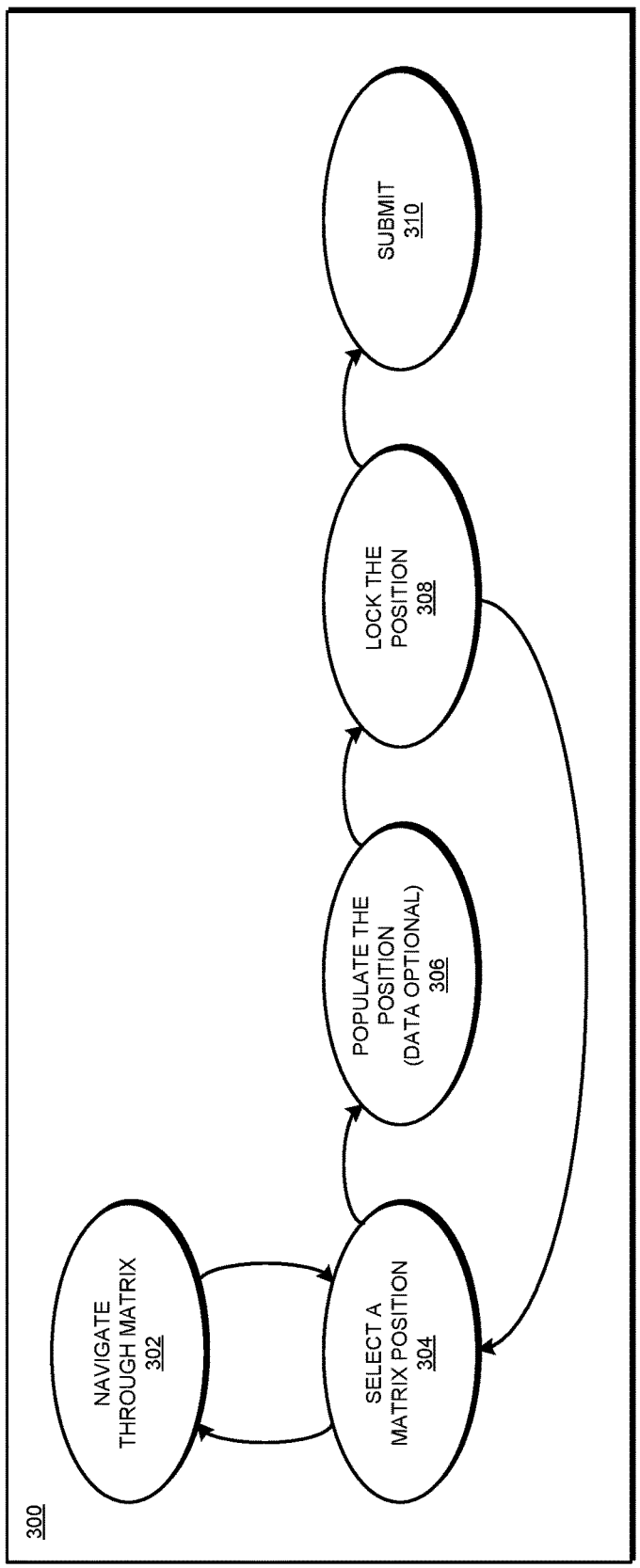
FIG. 3 depicts a state-transition diagram of an example operation for creating or using Multi-level matrix passwords in accordance with an illustrative embodiment.

With reference to FIG. 3, this figure depicts a state-transition diagram of an example operation for creating or using Multi-level matrix passwords in accordance with an illustrative embodiment. Any of applications 105, 111, or 134 can implement state-transitions 300.

An application implementing an embodiment or a portion thereof reaches state 302 when a user indicates using a suitable input that a password is to be entered. In state 302, the application receives an input to navigate to a position in a given matrix. State 302 can repeat any number of times until the navigation reaches a desired position in the matrix.

Once the navigation reaches a desired position, the application transitions to state 304 where a user input selects the position. A user input can select a position and return to navigating the matrix at state 302 without populating or locking the selected position. An auth-step with respect to the selected position is not constructed until a user input is received to lock the selected position at state 308.

The application then transitions to state 306 where the selected position can be optionally populated with data. The application may receive the data to populate the selected position via a suitable user input, or the application may receive a user input indicating that no data is to be populated in the selected position at state 306.

Once a user input indicates that the selected position has been populated with null or non-null data, the application transitions to state 308. At state 308, the application locks or otherwise makes the selected (and optionally populated) position unavailable for further selecting and/or populating actions during the password entry. At state 308, the application constructs an auth-step that encodes the position and any optional data populated therein. The application adds the auth-step to the auth-code being constructed.

The application returns to state 304 or 302 to continue password entry in this manner. Alternatively, when a user input indicates that the password entry is complete, the application transitions to state 310. At state 310, the application submits the auth-code, which comprises one or more auth-steps, for authentication.

Figure 4:
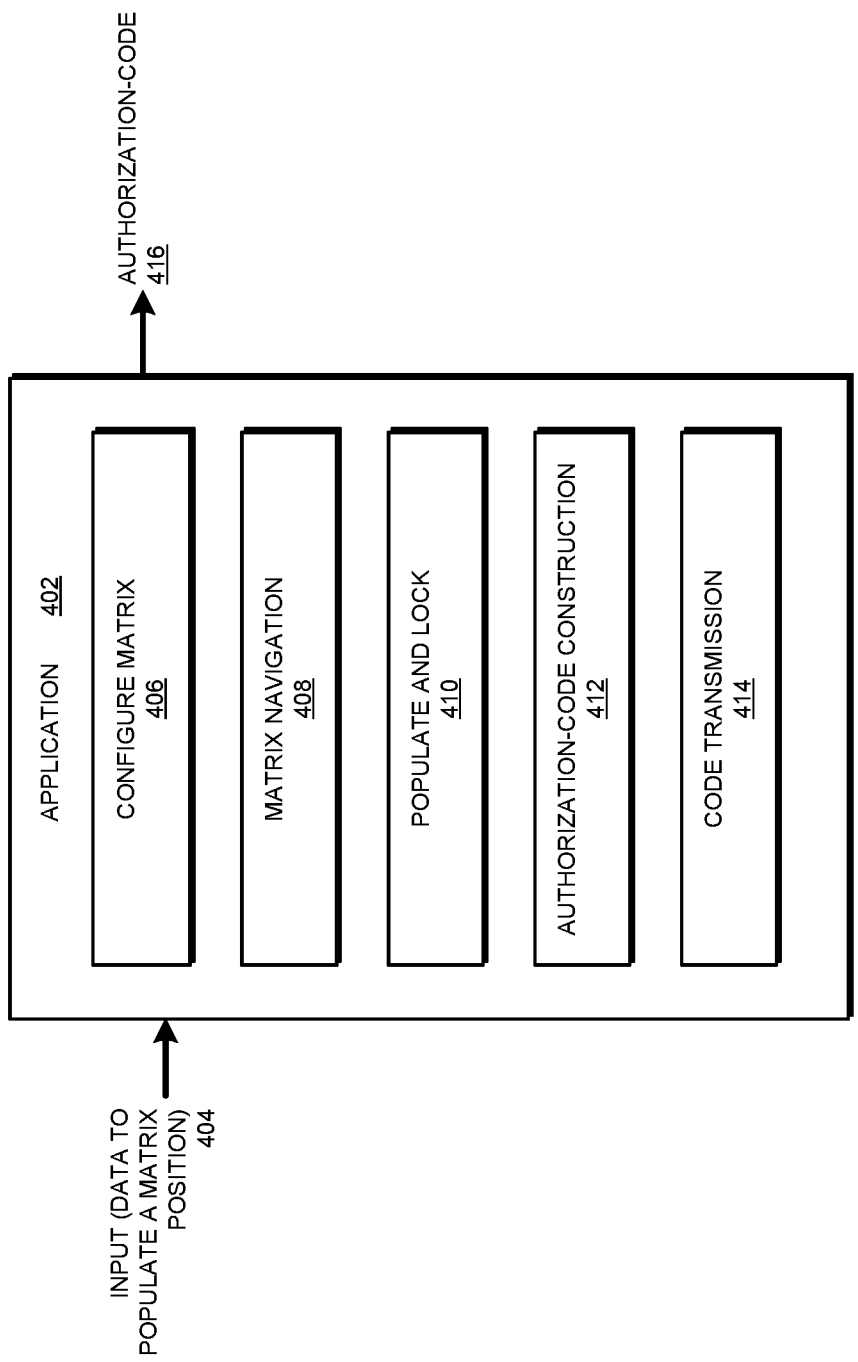
FIG. 4 depicts a block diagram of an example application for creating or using Multi-level matrix passwords in accordance with an illustrative embodiment.

With reference to FIG. 4, this figure depicts a block diagram of an example application for creating or using Multi-level matrix passwords in accordance with an illustrative embodiment. Application 402 can be implemented as application 105, 111, 134, or some combination thereof. Application 402 can be adapted to implement all or a part of state transitions 300 in FIG. 3.

Input 404 comprises one or more user inputs described with respect to FIG. 3. Application 402 receives input 404, which at one time indicates that a password entry is to be initiated. As an example, this input may be simply the placement of a cursor in a password entry area.

Component 406 constructs a matrix which is usable for password entry. For example, when a user is constructing or setting a password, application 402 uses component 406 to design the levels and level-positions, thereby constructing a suitably dimensioned matrix.

Once input 404 has indicated password entry initiation, component 408 uses user input 404 to navigate through the matrix to a position in the matrix. Input 404 may cause component 408 to navigate to several positions before selecting a position for data entry.

Component 410 receives from user input 404 any optional data that is to be populated in the selected position. At some point, user input 404 indicates that the use of the position—e.g. for null or non-null data entry—is complete. Component 410 locks the position as described herein.

The operations of components 408 and 410 continue as long as user input 404 continues to indicate more data entry for the password. At each locking operation, component 410 constructs an auth-step. Component 412 constructs an auth-code using the auth-step. When user input 404 indicates that the password entry is complete, component 414 transmits auth-code 416 that has been completed thus far. Auth-code 416 is transmitted to an authentication server or service.

Figure 5:
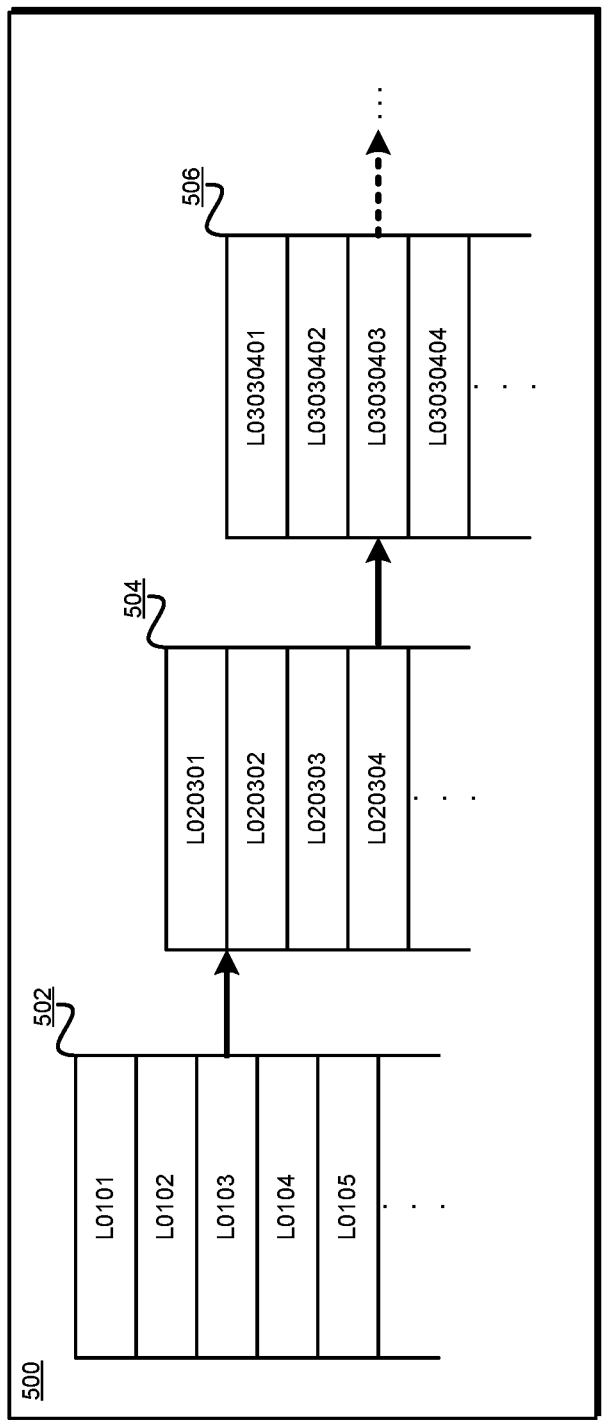
FIG. 5 depicts a block diagram of a manner of constructing an n-dimensional matrix in accordance with an illustrative embodiment.

With reference to FIG. 5, this figure depicts a block diagram of a manner of constructing an n-dimensional matrix in accordance with an illustrative embodiment. Component 406 in FIG. 4 can be used to construct matrix 500.

Only for the clarity of the description and not imply any limitation, assume that the positions of each level are arranged in a column form, as shown. The nomenclature of the labels associated with the positions is as follows—Each position is identified by the Level (L01, L02, . . . Ln) the position is in as well the position's place in the column (01, 02, . . . m). For example, label L0101 indicates Level 1, first position; i.e., level 1 position 1. Similarly, L020102 indicates Level 2 starting from Level 1 1st position, and 2nd position in Level 2; i.e., second position in the second level of the first position in the first level.

Other labels can be interpreted in a similar manner. A label of a position is used as the encoding of the position in an auth-step. Note that a position can be encoded in other ways as well within the scope of the illustrative embodiments, and the encoding is not intended to be limited to this example manner of labeling the positions.

Adopting this example labeling, column 502 depicts the first level of positions—L0101 . . . L0105 . . . . As an example, only position 3 of level 1 (L0103) is shown to have level 2 positions according to column 504. Other positions can also have second level positions (not shown) in the manner of column 504. L0103 has second level positions—L020301 . . . L020304 . . . . Again, as an example, only position 4 of level 2 of position 3 of level 1 (L020304) is shown to have level 3 positions according to column 506. Other positions in column 504, or other second levels (not shown) of other first-level positions can also have third level positions (not shown) in the manner of column 506. L020304 has third level positions—L03030401 (level 3 (L03) position 1 (01) of level 1 position 3 (03) level 2 position 4 (04)) . . . L03030404 . . . . Any number of other levels for any position at any level can be similarly constructed, each such level having any suitable number of positions therein.

Figure 6B:
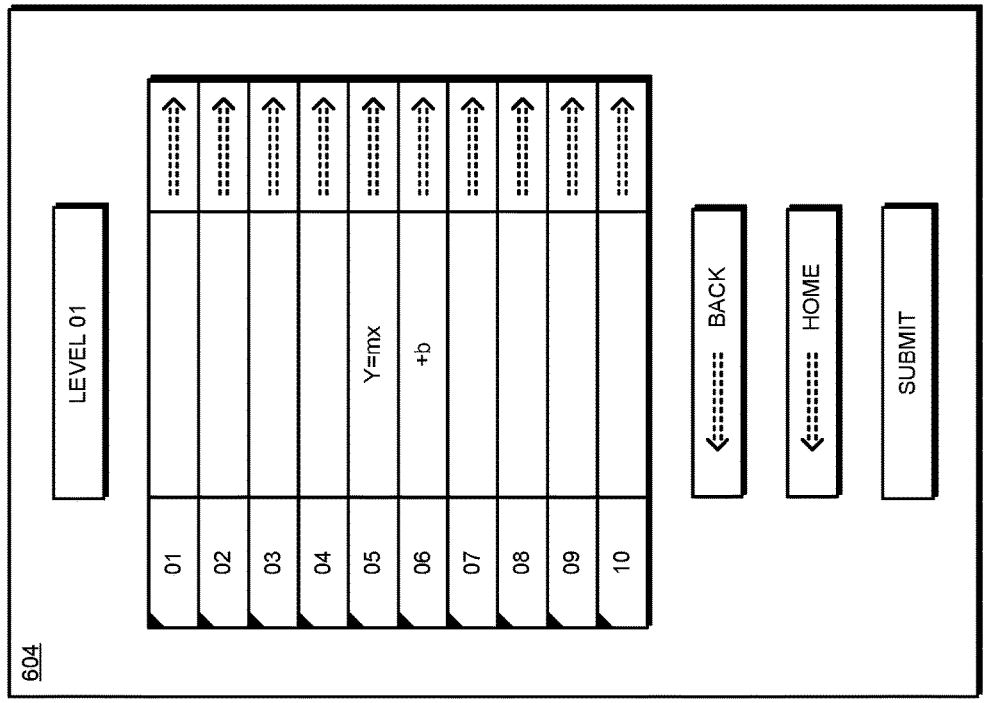
FIG. 6B depicts another example step in using the multi-dimensional matrix to input a password in accordance with an illustrative embodiment.
Figure 6A:
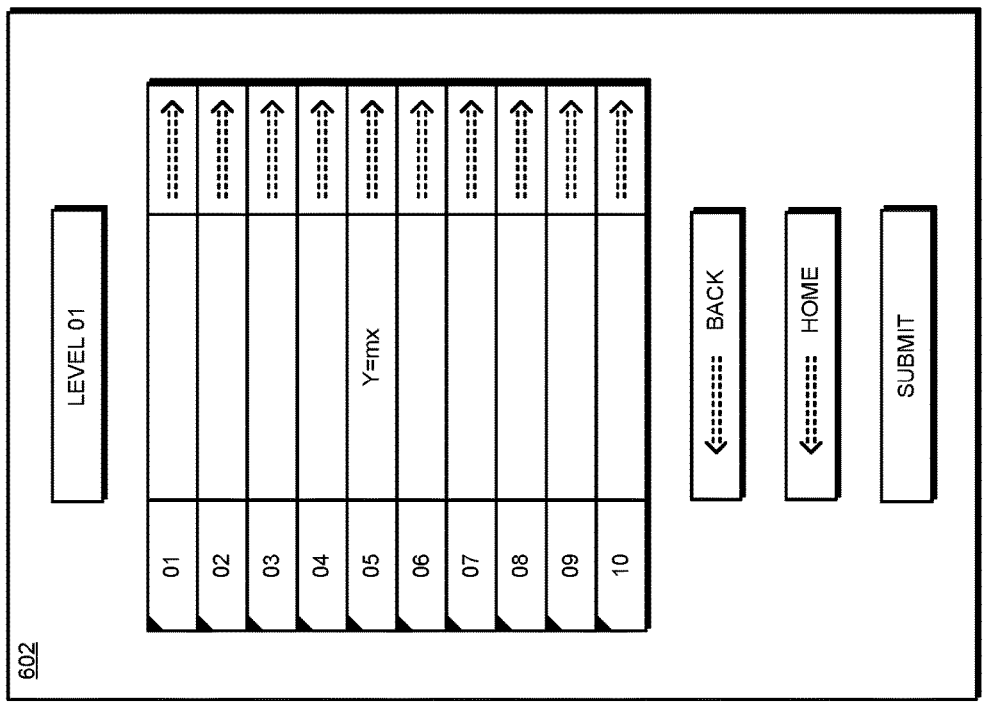
FIG. 6A depicts an example step in using a multi-dimensional matrix to input a password in accordance with an illustrative embodiment.

With reference to FIG. 6A, this figure depicts an example step in using a multi-dimensional matrix to input a password in accordance with an illustrative embodiment. The matrix used in FIGS. 6A-6I can be constructed using first level column 502 in FIG. 5.

Suppose, as a non-limiting example, that the password string that the user wants to use is "Y=mx+b!&a2+b2=c2". Further suppose that the user wants to input this string of characters into a 4-level matrix in the form of substrings "Y=mx", "+b", "!", "&", and "a2+b2=c2", where each substring is entered in a selected position in the 4-level matrix.

Further assume as a non-limiting example that the 4-level matrix has been constructed such that each level has 10 positions and each position in a given level has a sub-level comprising 10 position up to a total number of levels being four in the matrix. Thus, the example matrix comprises 10+10×10+10×10×10+10×10×10×10=11110 total positions.

The user has already provided an input (not shown) to initiate the password entry, in response to which the depicted matrix has been presented for accepting the password inputs.

According to step 602, positions 01-10 of level L01 are presented to the user. The user inputs substring "Y=mx" in position L0105.

FIG. 6B depicts another example step in using the multi-dimensional matrix to input a password in accordance with an illustrative embodiment. According to step 604, the user inputs substring "+b" in position L0106.

Figure 6D:
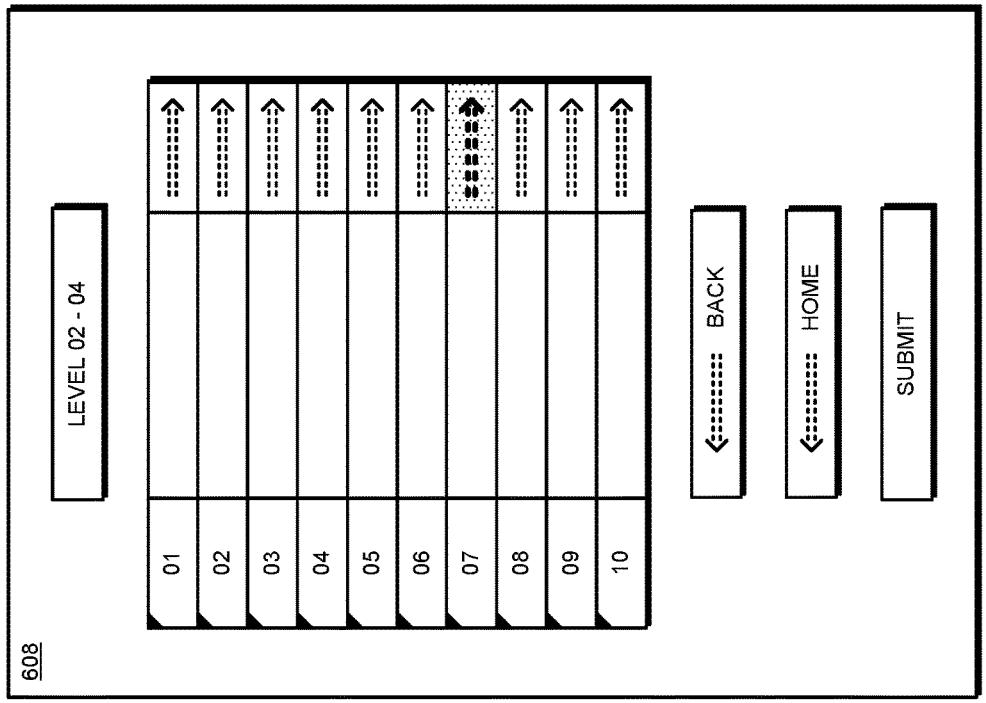
FIG. 6D depicts another example step in using the multi-dimensional matrix to input a password in accordance with an illustrative embodiment.
Figure 6C:
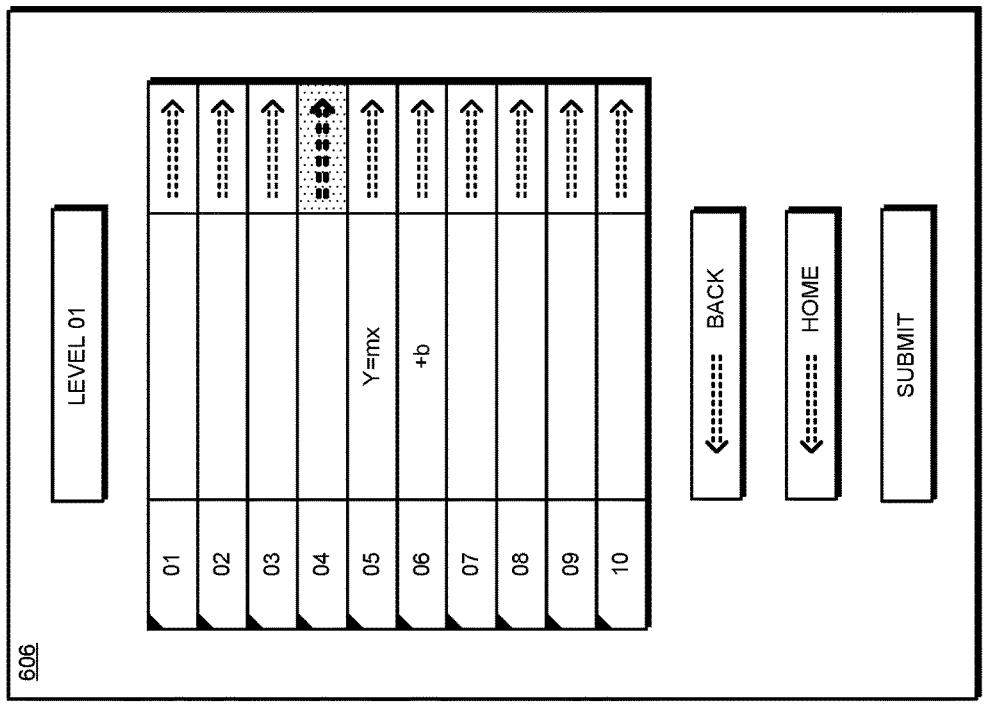
FIG. 6C depicts another example step in using the multi-dimensional matrix to input a password in accordance with an illustrative embodiment.

FIG. 6C depicts another example step in using the multi-dimensional matrix to input a password in accordance with an illustrative embodiment. According to step 606, the user inputs an indication to select a sub-level of position L0104.

FIG. 6D depicts another example step in using the multi-dimensional matrix to input a password in accordance with an illustrative embodiment. According to step 608, the user inputs an indication to select a sub-level of position L020407 without entering any data in any positions at level 2 of position 4 of level 1.

Figures 6E, 6F:
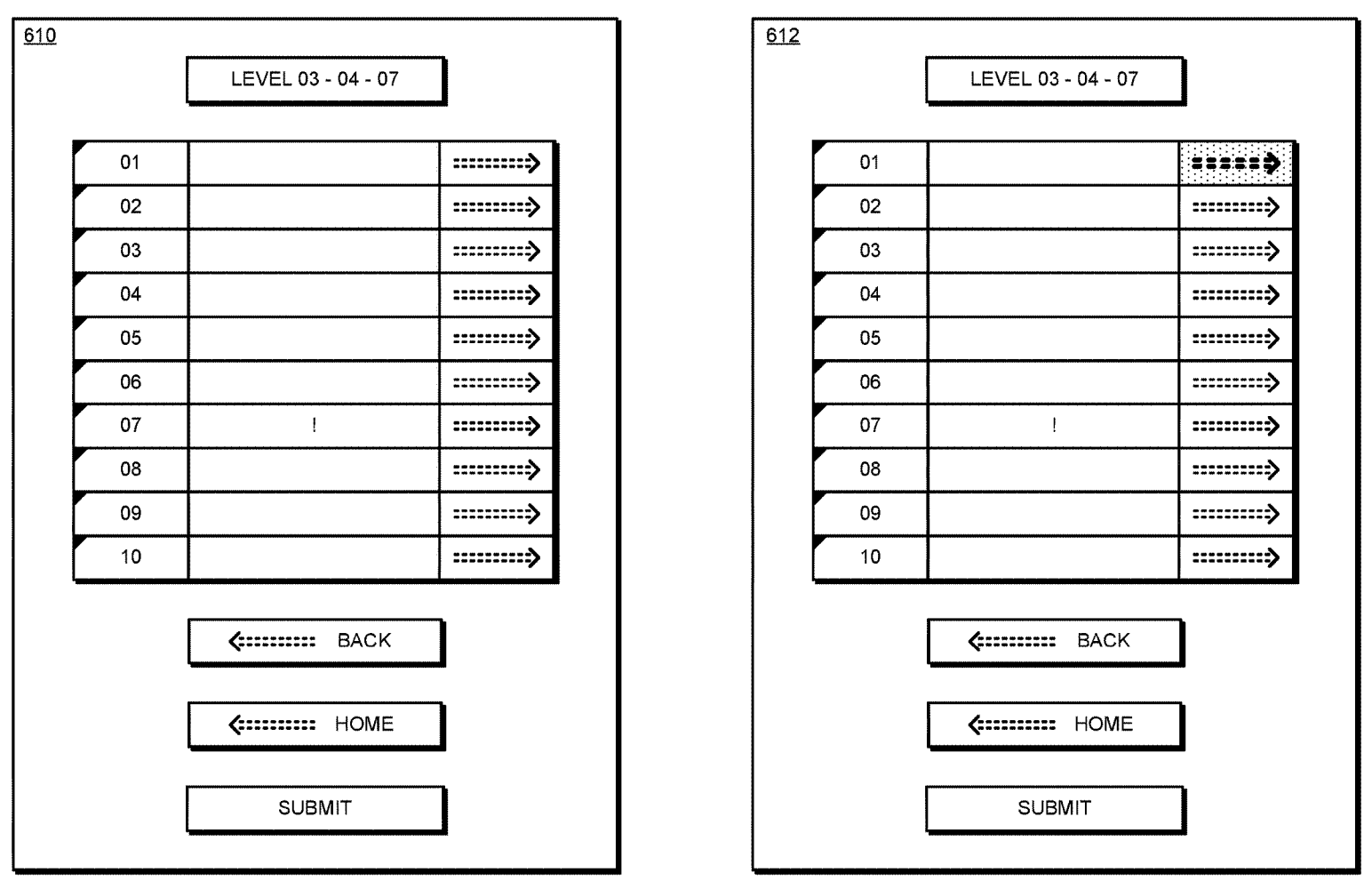

FIG. 6E depicts another example step in using the multi-dimensional matrix to input a password in accordance with an illustrative embodiment. According to step 610, the user inputs substring "!" in position L03040707.

FIG. 6F depicts another example step in using the multi-dimensional matrix to input a password in accordance with an illustrative embodiment. According to step 612, the user inputs an indication to select a sub-level of position L03040701.

Figures 6G, 6H:
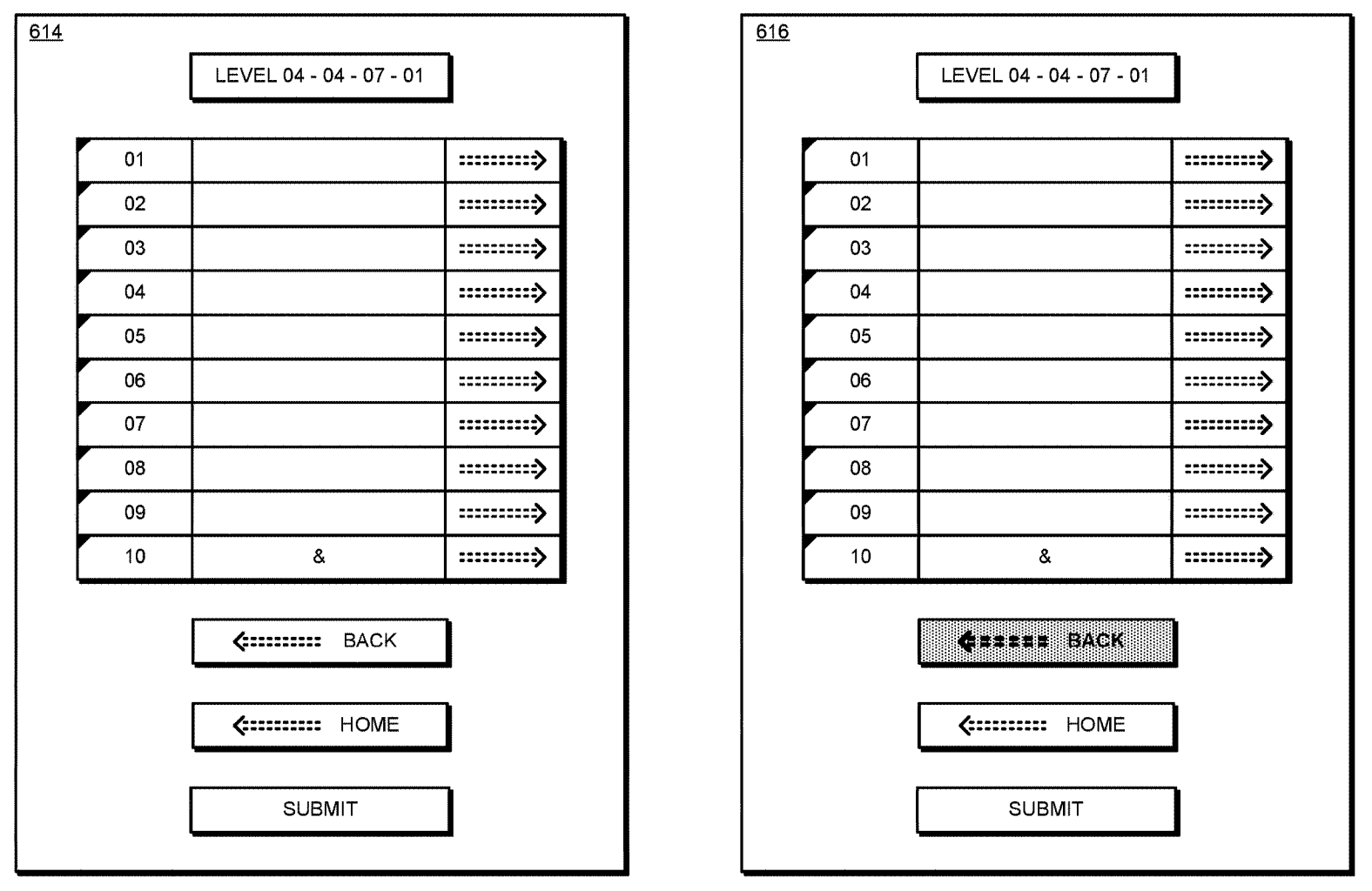

FIG. 6G depicts another example step in using the multi-dimensional matrix to input a password in accordance with an illustrative embodiment. According to step 614, the user inputs substring "&" in position L0404070110.

FIG. 6H depicts another example step in using the multi-dimensional matrix to input a password in accordance with an illustrative embodiment. According to step 616, the user inputs an indication to go back up one level, i.e., to level 03 in the path that was traversed to reach L0404070110. In this example, the user provides the indication by providing an input at the "back" button.

Figure 6I:
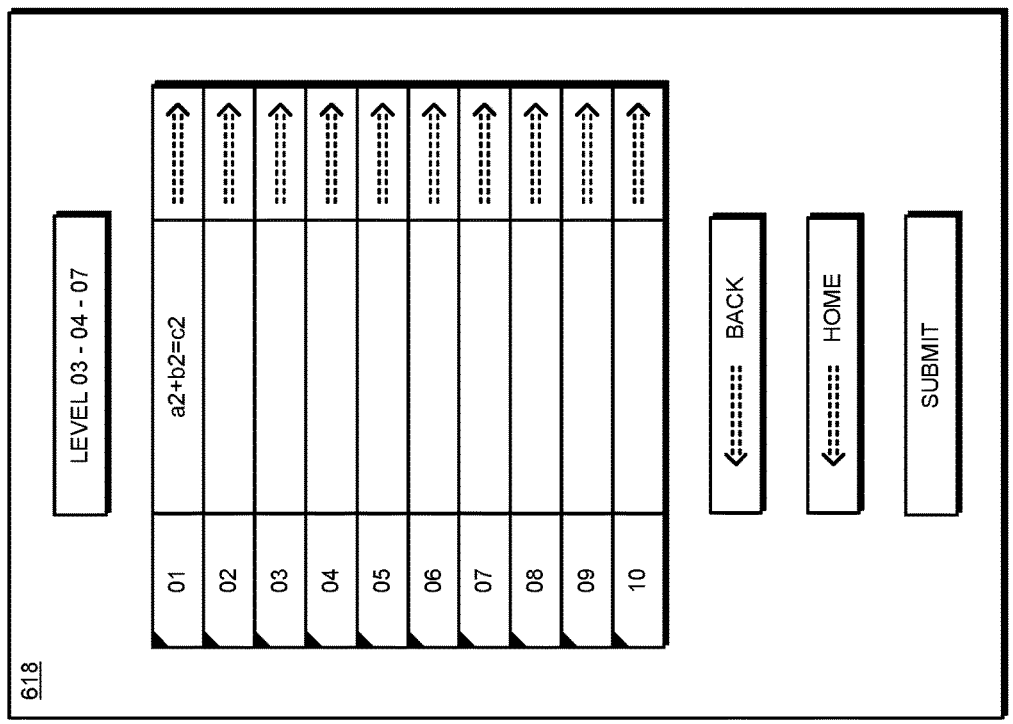
FIG. 6I depicts another example step in using the multi-dimensional matrix to input a password in accordance with an illustrative embodiment.

FIG. 6I depicts another example step in using the multi-dimensional matrix to input a password in accordance with an illustrative embodiment. According to step 618, the user inputs substring "a2+b2=C2" in position L03040701.

Figure 6J:
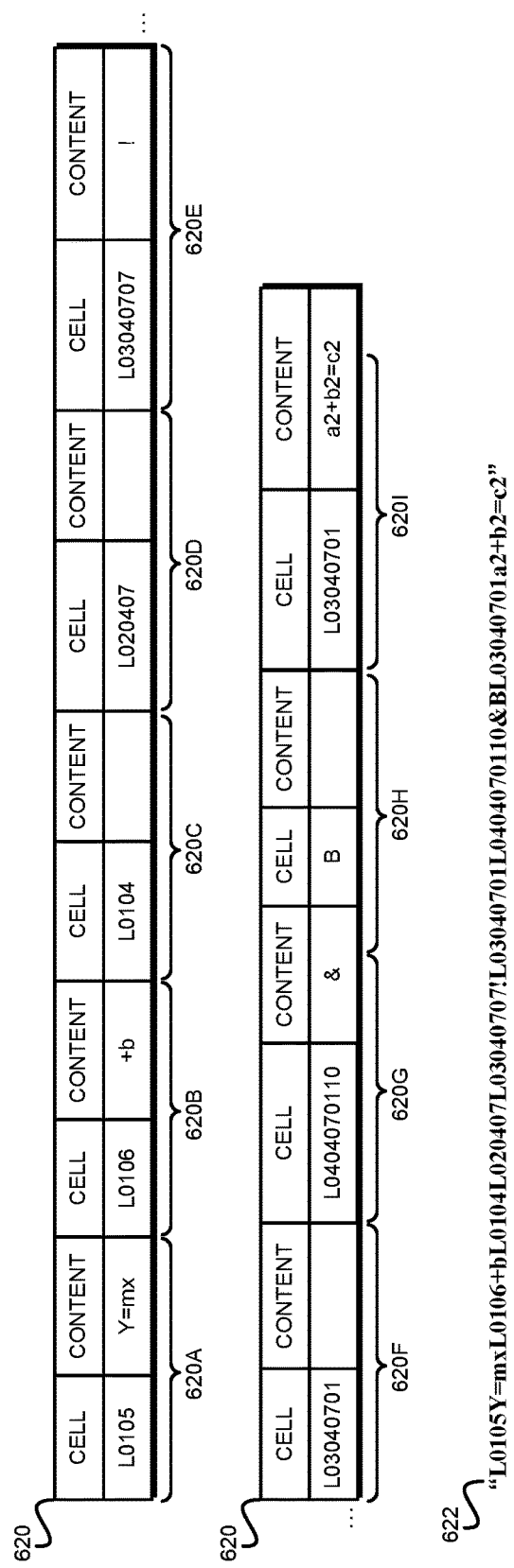
FIG. 6J depicts another example step in using the multi-dimensional matrix to input a password in accordance with an illustrative embodiment

FIG. 6J depicts another example step in using the multi-dimensional matrix to input a password in accordance with an illustrative embodiment. Table 620 shows the various auth-steps constructed from steps 602-618 of FIGS. 6A-6I. For example, auth-step 620A shows position encoding L0105 and content "Y=mx" in position L0105 from step 602; auth-step 620B shows position encoding L0106 and content "+b" in position L0106 from step 604; auth-step 620C shows position encoding L0104 with no content from step 606; auth-step 620D shows position encoding L020407 with no content from step 608; auth-step 620E shows position encoding L03040707 and content "!" in position L03040707 from step 610; auth-step 620F shows position encoding L03040701 with no content from step 612; auth-step 620G shows position encoding L0404070110 and content "&" in position L0404070110 from step 614; auth-step 620H shows position encoding B (or other suitable encoding for indicating stepping back in the matrix path) with no content from step 616; and auth-step 620I shows position encoding L03040701 and content "a2+b2=c2" in position L03040701 from step 618.

Correspondingly, example auth-code 622 is formed as "L0105Y=mxL0106+bL0104L020407L03040707!L03040701L0404070110&BL03040701a2+b2=c2". In FIG. 6I, if a user input selects "Submit" button, auth-code 622 is sent to an authentication service. As can be seen in this non-limiting example, auth-steps are created even when no content data is added to a position in the matrix, and such auth-steps still yield a non-null auth-code. Thus, the illustrative embodiments permit a user to form a password with no content whatsoever added to any positions, and simply by navigating a unique path through the multi-level matrix.

Figure 7:
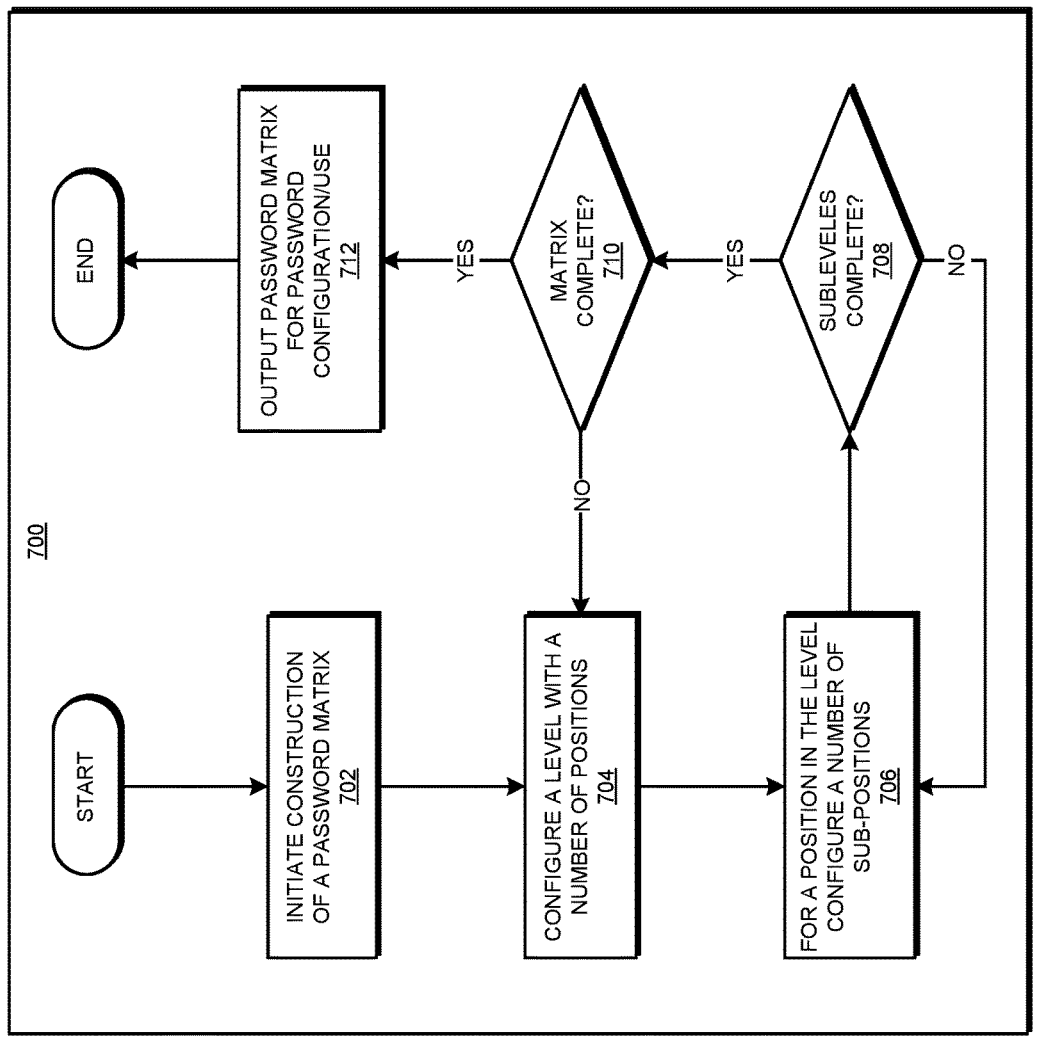
FIG. 7 depicts a flowchart of an example process for constructing a multi-dimensional matrix in accordance with an illustrative embodiment.

With reference to FIG. 7, this figure depicts a flowchart of an example process for constructing a multi-dimensional matrix in accordance with an illustrative embodiment. Process 700 can be implemented in application 402 in FIG. 4, such as in component 406.

The application initiates the construction of a matrix (block 702). The application configures a level with a number of positions (block 704). For a configured position in the level, the application configures a number of positions in a sub-level, i.e., sub-positions, (block 706).

The application determines whether the sub-level configuration for the positions at the level is complete (block 708). If the sub-level configuration is not complete ("No" path of block 708), the application returns to block 706 and continues configuring one or more sub-levels for the positions in the level. If the sub-level configuration is complete ("Yes" path of block 708), the application determines whether the construction of the matrix is complete (block 710).

If the construction of the matrix is not complete ("No" path of block 710), the application returns to block 704 and continues construction of the matrix, e.g., by selecting a position in one of the sub-levels and building more sub-levels from that position, or selecting another position at the level and building a sub-level. If the construction of the matrix is complete ("Yes" path of block 710), the application outputs the matrix for password entry, e.g., for password configuration or password use. The application ends process 700 thereafter.

Figure 8:
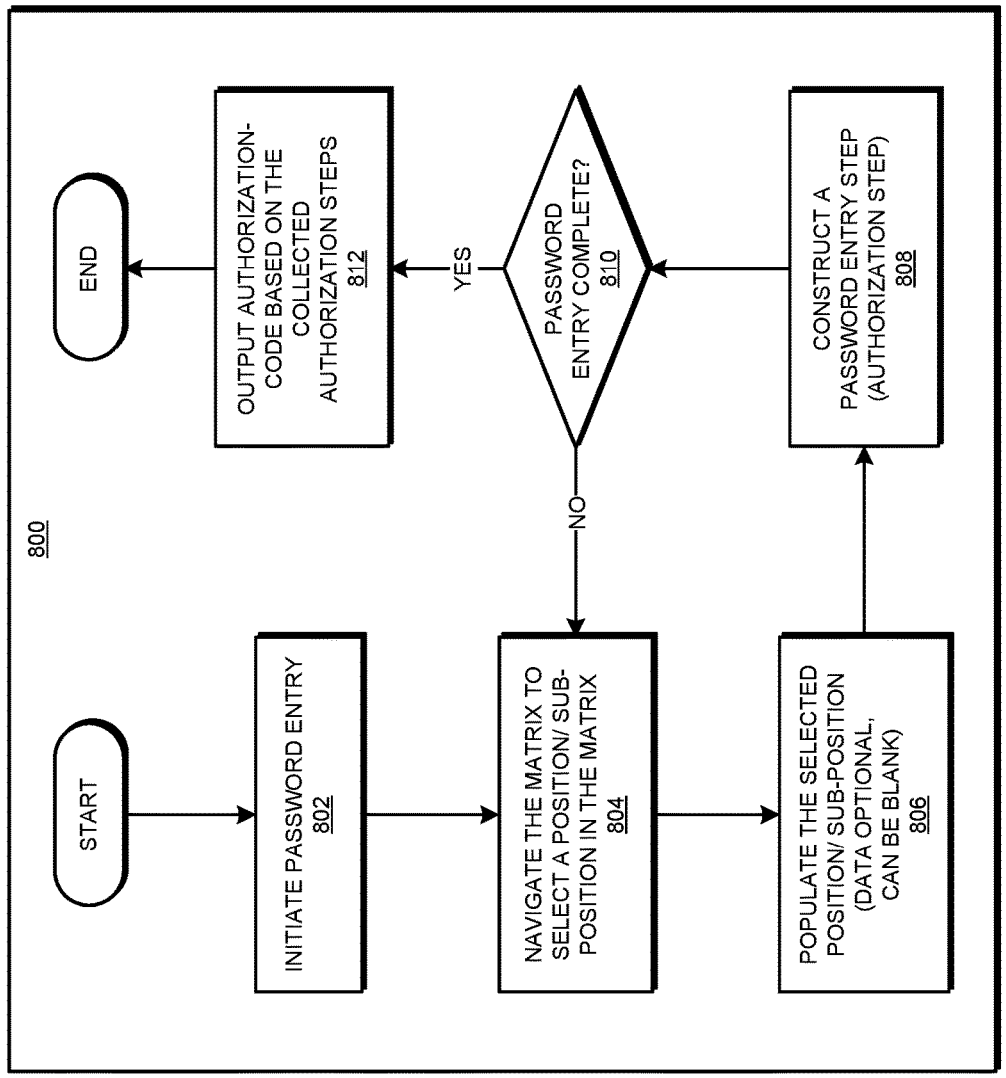
FIG. 8 depicts a flowchart of an example process for password entry using a multi-dimensional matrix in accordance with an illustrative embodiment.

With reference to FIG. 8, this figure depicts a flowchart of an example process for password entry using a multi-dimensional matrix in accordance with an illustrative embodiment. Process 800 can be implemented in application 402 in FIG. 4.

The application initiates password entry (block 802). The application navigates the matrix to select a position in a level or a sub-level in the matrix (block 804). The application optionally populates the selected position with data (block 806). The application constructs an auth-step using the selection and the optional data (block 808).

The application determines whether the password entry process has been completed (block 810). If the password entry is not complete ("No" path of block 810), the application returns to block 804. If the password entry is complete ("Yes" path of block 810), the application constructs an auth-code using the accumulated auth-steps and outputs the auth-code (block 812). The application ends process 800 thereafter.

Thus, a system or apparatus, and computer program product are provided in the illustrative embodiments for Multi-level matrix passwords and other related features, functions, or operations. Where an embodiment or a portion thereof is described with respect to a type of device, the system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer usable program product comprising one or more computer-readable storage media, and program instructions stored on at least one of the one or more storage media, the stored program instructions comprising:
   program instructions to traverse, during a password entry, a matrix to select a position, wherein the matrix comprises a plurality of levels, each level in the plurality of levels comprising at least one position where data can be entered, wherein a second level in the matrix forms a sub-level of a first level, and wherein the second level is reachable only from a particular position in the first level;
   program instructions to change, responsive to an input, a mode of the selected position such that the position becomes unchangeable and unselectable during a remainder of the password entry;
   program instructions to encode the selected position in an auth-step; and
   program instructions to transmit, responsive to an indication of an end of the password entry, an auth-code, the auth-code comprising a set of auth-steps, the set of auth-steps including the auth-step.

2. The computer usable program product of claim 1, further comprising:
   program instructions to construct the auth-code using the set of auth-steps, wherein each auth-step in the set of auth-steps results from a mode change of a different position.

3. The computer usable program product of claim 1, further comprising:
   program instructions to populate the selected position with data provided in an input, wherein the encoding further encodes the data in the auth-step.

4. The computer usable program product of claim 1, further comprising:
   program instructions to construct the first level in the matrix, the first level comprising a first set of positions; and
   program instructions to construct the second level in the matrix such that a second set of positions at the second level is reachable from the particular position in the first set of positions at the first level.

5. The computer usable program product of claim 4, further comprising:
   program instructions to construct a third level, wherein the third level is a sub-level of the second level, wherein the third level comprises a third set of positions, the third set of positions being reachable from a particular position in the second set of positions at the second level.

6. The computer usable program product of claim 5, wherein the second set of positions and the third set of positions include different numbers of positions.

7. The computer usable program product of claim 4, wherein the first set of positions and the second set of positions include different numbers of positions.

8. The computer usable program product of claim 1, wherein the data entered at a selected position in the matrix comprises character data.

9. The computer usable program product of claim 1, wherein the computer usable code is stored in a computer readable storage device in a data processing system, and wherein the computer usable code is transferred over a network from a remote data processing system.

10. The computer usable program product of claim 1, wherein the computer usable code is stored in a computer readable storage device in a server data processing system, and wherein the computer usable code is downloaded over a network to a remote data processing system for use in a computer readable storage device associated with the remote data processing system.

11. The computer usable program product of claim 1, wherein the selected position is reached by traversing through a first position at a first level, to reach an n-th position at an m-th level, wherein the m-th level is reachable only via a traversal path that starts at the first position at the first level.

12. A computer system comprising:
one or more processors;
one or more computer-readable memories; and
one or more computer-readable storage media, and program instructions stored on at least one of the one or more storage media for execution by at least one of the one or more processors via at least one of the one or more memories, the stored program instructions comprising:
program instructions to traverse, during a password entry, a matrix to select a position, wherein the matrix comprises a plurality of levels, each level in the plurality of levels comprising at least one position where data can be entered, wherein a second level in the matrix forms a sub-level of a first level, and wherein the second level is reachable only from a particular position in the first level;
program instructions to change, responsive to an input, a mode of the selected position such that the position becomes unchangeable and unselectable during a remainder of the password entry;
program instructions to encode the selected position in an auth-step; and
program instructions to transmit, responsive to an indication of an end of the password entry, an auth-code, the auth-code comprising a set of auth-steps, the set of auth-steps including the auth-step.

13. The computer system of claim 12, further comprising:
program instructions to construct the auth-code using the set of auth-steps, wherein each auth-step in the set of auth-steps results from a mode change of a different position.

14. The computer system of claim 12, further comprising:
program instructions to populate the selected position with data provided in an input, wherein the encoding further encodes the data in the auth-step.

15. The computer system of claim 12, further comprising:
program instructions to construct the first level in the matrix, the first level comprising a first set of positions; and
program instructions to construct the second level in the matrix such that a second set of positions at the second level is reachable from the particular position in the first set of positions at the first level.

16. The computer system of claim 15, further comprising:
program instructions to construct a third level, wherein the third level is a sub-level of the second level, wherein the third level comprises a third set of positions, the third set of positions being reachable from a particular position in the second set of positions at the second level.

17. The computer system of claim 16, wherein the second set of positions and the third set of positions include different numbers of positions.

18. The computer system of claim 15, wherein the first set of positions and the second set of positions include different numbers of positions.

19. The computer system of claim 12, wherein the data entered at a selected position in the matrix comprises character data.

20. The computer system of claim 12, wherein the computer usable code is stored in a computer readable storage device in a data processing system, and wherein the computer usable code is transferred over a network from a remote data processing system.

* * * * *